United States Patent
Qin et al.

(10) Patent No.: US 10,926,713 B2
(45) Date of Patent: Feb. 23, 2021

(54) KNOB DEVICE FOR VEHICLE

(71) Applicant: AAC Technologies Pte. Ltd., Singapore (SG)

(72) Inventors: Yingming Qin, Shenzhen (CN); Bing Xie, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/932,868

(22) Filed: Jul. 20, 2020

(65) Prior Publication Data
US 2020/0406832 A1    Dec. 31, 2020

Related U.S. Application Data

(63) Continuation of application No. PCT/CN2019/094050, filed on Jun. 30, 2019.

(51) Int. Cl.
| | |
|---|---|
| *B60R 11/02* | (2006.01) |
| *G05G 1/12* | (2006.01) |
| *G05G 5/22* | (2006.01) |
| *G05G 5/03* | (2008.04) |

(52) U.S. Cl.
CPC ............ *B60R 11/0264* (2013.01); *G05G 1/12* (2013.01); *G05G 5/03* (2013.01); *G05G 5/22* (2013.01); *G05G 2505/00* (2013.01)

(58) Field of Classification Search
CPC .............................. G05G 5/22; G05G 2505/00
See application file for complete search history.

(56) References Cited

U.S. PATENT DOCUMENTS

| | | | | |
|---|---|---|---|---|
| 4,253,690 A | * | 3/1981 | Hollander | ............... F16K 35/00 292/354 |
| 8,797,153 B2 | * | 8/2014 | Vanhelle | .................. G05G 5/03 340/407.2 |
| 2007/0159307 A1 | * | 7/2007 | Jannasch | ................ B60K 37/06 340/407.1 |
| 2009/0000407 A1 | * | 1/2009 | Meyer | ..................... F16H 59/08 74/10.1 |

* cited by examiner

*Primary Examiner* — Vicky A Johnson
(74) *Attorney, Agent, or Firm* — W&G Law Group LLP (57) ABSTRACT

The present disclosure provides a knob device for vehicle which includes a knob unit and a locking unit. The knob unit includes a rotating cover, a rotary shaft and a motor configured to drive the rotating cover to vibrate. The locking unit includes a rotary wheel which includes a main body fixed to the rotary shaft and locking teeth formed at a periphery of the main body. The locking tooth includes a first end, a second end and a surface connecting the first end and the second end. A distance between the first end and the central axis of the rotary wheel is greater than a distance between the second end and the central axis. The locking unit further includes a locking pole configured to abut the first end to limit rotation of the rotary wheel clockwise, and an actuator configured to drive the locking pole to move.

14 Claims, 11 Drawing Sheets

KNOB DEVICE FOR VEHICLE

FIELD OF THE INVENTION

The present disclosure relates to the technical field of auto accessories, and in particular to a knob device for vehicle.

BACKGROUND OF THE INVENTION

In recent years, with the rapid development of science and technology, a popularity rate of automotives is getting higher and higher. In automotive accessories, volume keys, air conditioning keys, and screen brightness keys are mostly designed in the form of knobs.

In the related art, the knob device for vehicle includes a knob unit. The knob unit includes a rotating cover and a rotary shaft. The rotary shaft is connected to the rotating cover and related function keys can be adjusted by rotating the rotating cover. In such design, a position of the rotating cover cannot be locked. The rotating cover is easy to be operated mistakenly, which influences the user experience.

Therefore, it is necessary to provide a new knob device for vehicle to solve the above technical problems.

SUMMARY OF THE INVENTION

An object of the present disclosure is to provide a knob device for vehicle which is simple in structure and can be locked.

The present disclosure provides a knob device for vehicle comprising a knob unit and a locking unit. The knob unit comprises a rotating cover having an open end; a rotary shaft being mounted to the open end of the rotating cover; and a motor being fixed to the rotating cover and driving the rotating cover to vibrate. The locking unit comprises a rotary wheel being mounted to the rotary shaft. The rotary wheel comprises a main body being fixed to the rotary shaft; a rotary wheel mounted to the rotary shaft, the rotary wheel comprising a main body fixed to the rotary shaft, and a plurality of locking teeth being arranged at a periphery of the main body, the plurality of locking teeth being distributed in a ring around a central axis of the rotary wheel, the locking tooth comprising a first end, a second end and a surface connecting the first end and the second end, a distance between the first end and the central axis of the rotary wheel being greater than a distance between the second end and the central axis of the rotary wheel. The locking unit further comprises a locking pole being provided corresponding to the first end and configured to abut the first end to block rotation of the rotary wheel; and an actuator connected to the locking pole and configured to drive the locking pole to move toward the rotary wheel or away from the rotary wheel.

In some embodiments, the number of the locking teeth is eight, and an angle spanned by each locking tooth is 45°.

In some embodiments, the transition surface is curved.

In some embodiments, the rotating cover comprises an outer surface and an inner surface opposite to the outer surface, the inner surface comprises two mounting surfaces arranged in parallel and spaced from each other and two connecting surfaces connecting the two mounting surfaces.

In some embodiments, two symmetrical first connecting poles extend from the connecting surfaces along directions away from the outer surface, two symmetrical latching slots are recessed from the mounting surfaces along directions towards the outer surface, the two first connecting poles are arranged along a Y-axis direction, and the two latching slots are arranged along an X-axis direction, wherein the Y-axis direction is parallel to a vibration direction of the motor, and the X-axis direction is perpendicular to the Y-axis direction.

In some embodiments, the rotary shaft comprises a connecting portion and a shaft body connected to the connecting portion, the connecting portion is received in the open end of the rotating cover, the connecting portion comprises a first portion connected to the shaft body, and a second portion and a third portion which extend from opposite two ends of the first portion along a direction away from the shaft body, the second portion and the third portion are arranged in parallel and spaced from each other, and the second portion and the third portion abut on the mounting surfaces respectively.

In some embodiments, a protrusion extends from each of the two ends of the first portion along a direction towards a corresponding mounting surface of the rotating cover, the protrusions conform to the latching slots respectively, and the protrusions are engaged in the latching slots respectively.

In some embodiments, a second connecting pole extends from each of opposite two sides of the first portion along a direction towards the connecting surface of the rotating cover, each second connecting pole is aligned with a corresponding first connecting pole, the knob unit further comprises a spring, one end of the spring is mounted around the first connecting pole, the other end of the spring is mounted around the second connecting pole, adjacent ends of the first connecting pole and the second connecting pole are spaced from each other, and a middle portion of the spring between the adjacent ends of the first connecting pole and the second connecting pole is suspended.

In some embodiments, a space is formed between the second portion and the third portion, and the motor is received in the space.

In some embodiments, the connecting portion and the shaft body are integrally formed.

In some embodiments, the knob device further comprises an encoder and a processor, the encoder is connected to the rotary shaft by a coupling, the encoder is configured to detect a rotation angle of the rotary wheel and transmit a detection data in response to the rotation angle to the processor, and the processor is configured to control operation of the actuator in response to the detection data.

In some embodiments, the locking pole is made of iron, and the actuator comprises a solenoid which comprises a stationary part and a moveable part moveable relative to the stationary part, the locking pole being a portion of the moveable part or connected to the moveable part.

In some embodiments, the knob device further comprises a brush slip ring unit which comprises a pair of slip rings fixed around the rotary shaft and brushes slidably contacting with the slip rings respectively, wherein the rotary shaft defines a wire channel, and power wires and control wires of the motor are arranged in the wire channel and electrically connected to the slip rings respectively.

In some embodiments, the brush slip ring unit comprises a pair of brushes corresponding to each of the slip rings, and an elastic member connected between the pair of brushes and configured to urge the pair of brushes to firmly contact with the corresponding slip ring.

Compared with the related arts, the knob device for vehicle according to exemplary embodiments of the present disclosure comprises a locking unit which includes a rotary wheel, a locking pole cooperating with the rotary wheel, and an actuator configured for driving the locking pole to extend out or retract. The rotary wheel includes a plurality of locking teeth each comprising a first end and a second end.

The locking pole can be driven to move outwardly to abut against the first end of a corresponding tooth, thereby blocking rotation of the rotary wheel clockwise, locking the rotary wheel clockwise and realizing diverse use requirements of the knob device for vehicle.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DETAILED DESCRIPTION OF THE PREFERRED EMBODIMENTS

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Figure 1:
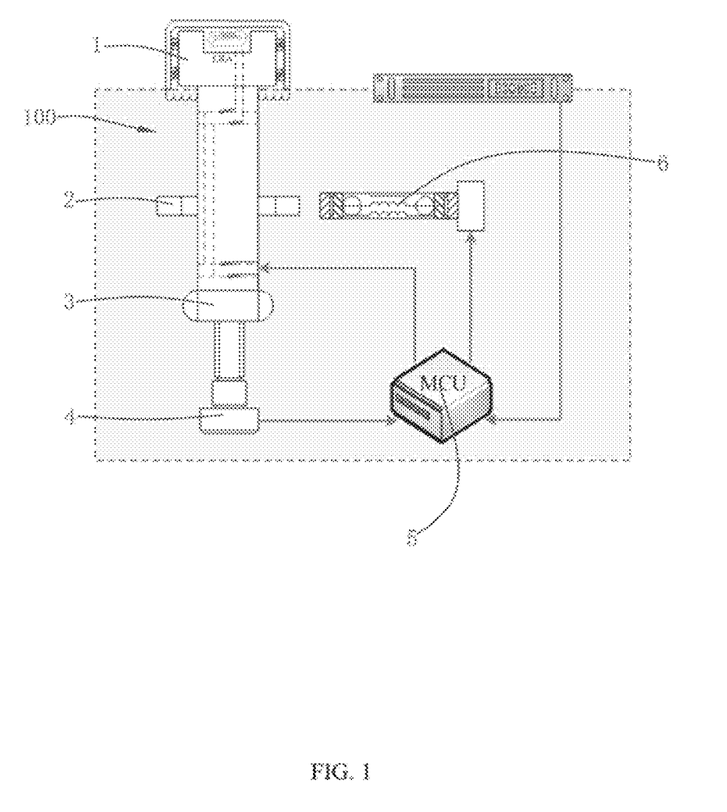
FIG. 1 is a schematic view of a knob device for vehicle according to an exemplary embodiment of the present disclosure.
Figure 2:
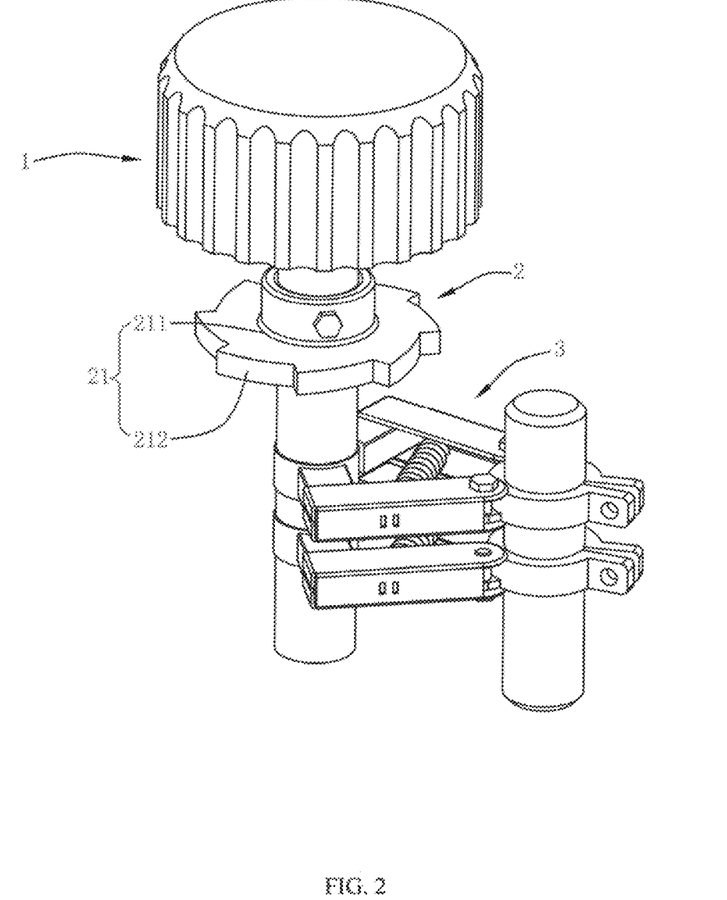
FIG. 2 is a perspective, schematic view of the knob device according to an exemplary embodiment of the present disclosure.

Referring to FIG. 1 and FIG. 2, the present disclosure provides a knob device 100 for vehicle. The knob device 100 can be used as a volume key, an air conditioning adjusting key, a screen brightness adjusting key, or other functional keys which are used in vehicles. The knob device 100 includes a knob unit 1, a locking unit 2, a carbon brush slip ring unit 3, a coupling 4, an encoder 5, and a processor 6.

Figure 3:
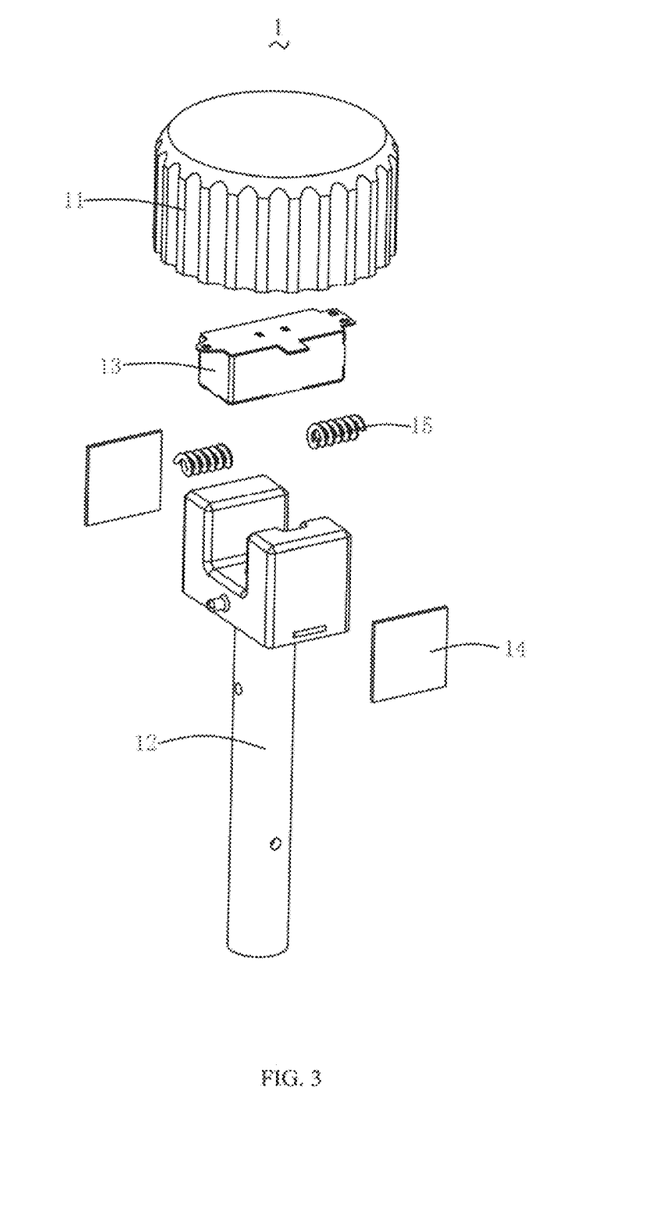
FIG. 3 is an exploded, schematic view of a knob unit shown in FIG. 2.
Figure 4:
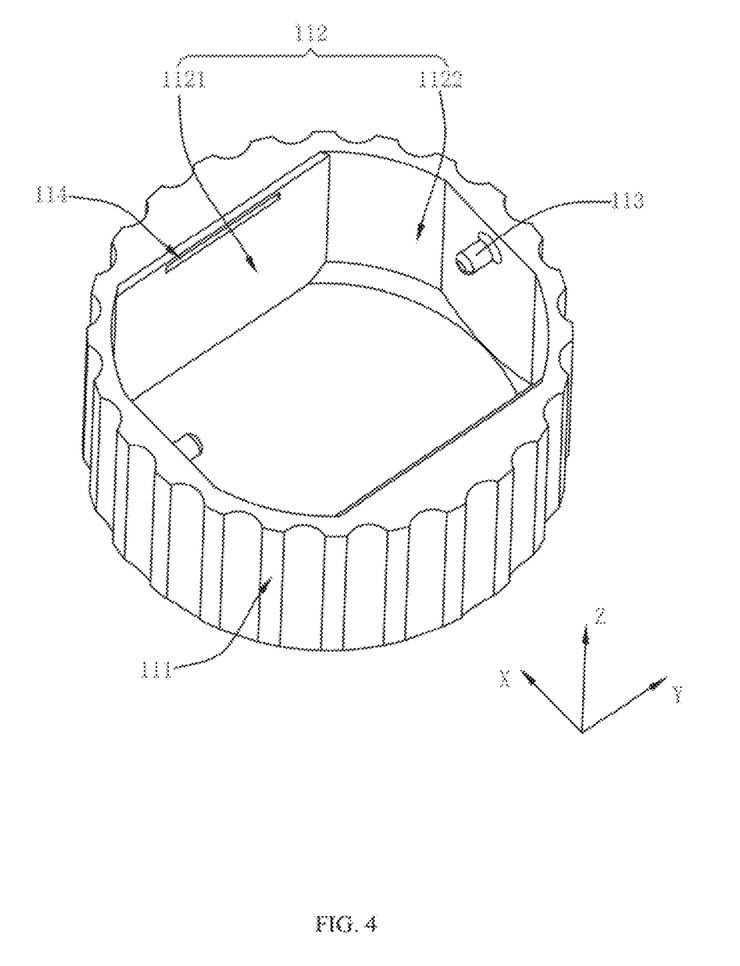
FIG. 4 is a perspective, schematic view of a rotating cover shown in FIG. 3.

Referring to FIG. 3 and FIG. 4, the knob unit 1 is used as an interactive terminal for the users, which includes a rotating cover 11, a rotary shaft 12, a motor 13, a foam 14 and a spring 15.

The rotating cover 11 has a cylindrical shape with one end being open and the other end being closed. The rotating cover 11 includes an outer surface 111 and an inner surface 112 opposite to the outer surface 111. The outer surface 111 is recessed along a direction towards the inner surface 112 to form a plurality of anti-skid structures. The anti-skid structures can increase the friction between the user and the knob when the knob is in use, and has an anti-skid effect.

The inner surface 112 includes two mounting surfaces 1121 arranged in parallel and spaced from each other and two connecting surfaces 1122 connecting the two mounting surfaces 1121. The two mounting surfaces 1121 and the two connecting surfaces 1122 cooperatively form a cavity. Two symmetrical first connecting poles 113 respectively extend from the connecting surfaces 1122 along directions away from the outer surface 111. Two symmetrical latching slots 114 are recessed from the mounting surface 1121 along directions towards the outer surface 111. Specifically, the two first connecting poles 113 are spaced arranged along the Y-axis direction, and the two latching slots 114 are spaced arranged along the X-axis direction. The X-axis direction is the direction of X-axis shown in FIG. 4 or FIG. 5, and the Y axis direction is the direction of Y-axis shown in FIG. 4 or FIG. 5.

Figure 5:
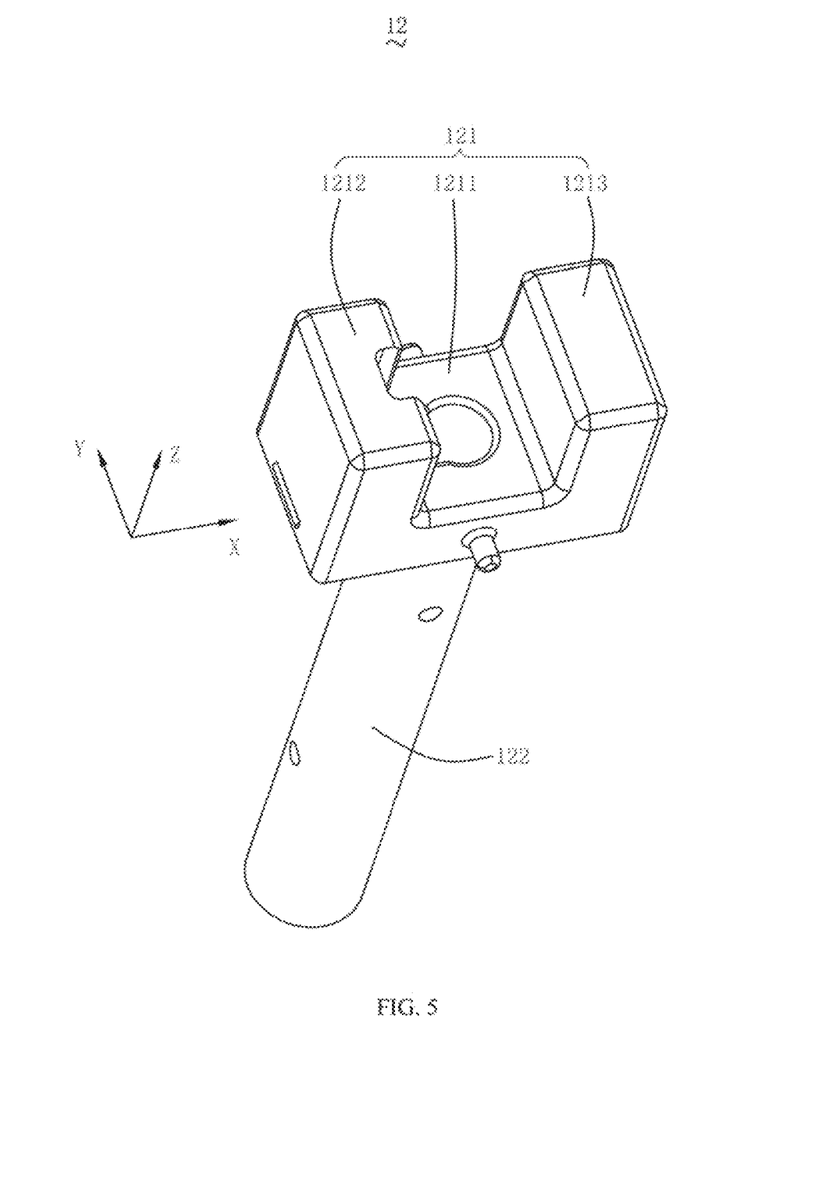
FIG. 5 is a perspective, schematic view of a rotary shaft shown in FIG. 1.
Figure 6:
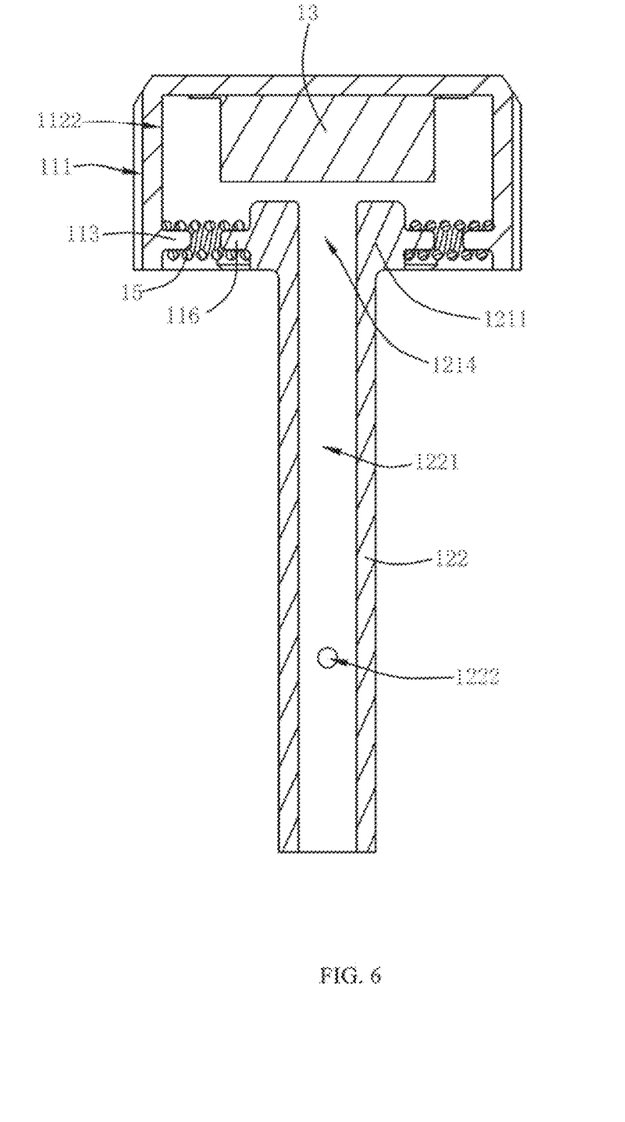
FIG. 6 is a cross-sectional view of the knob unit of FIG. 3 taken along one direction.
Figure 7:
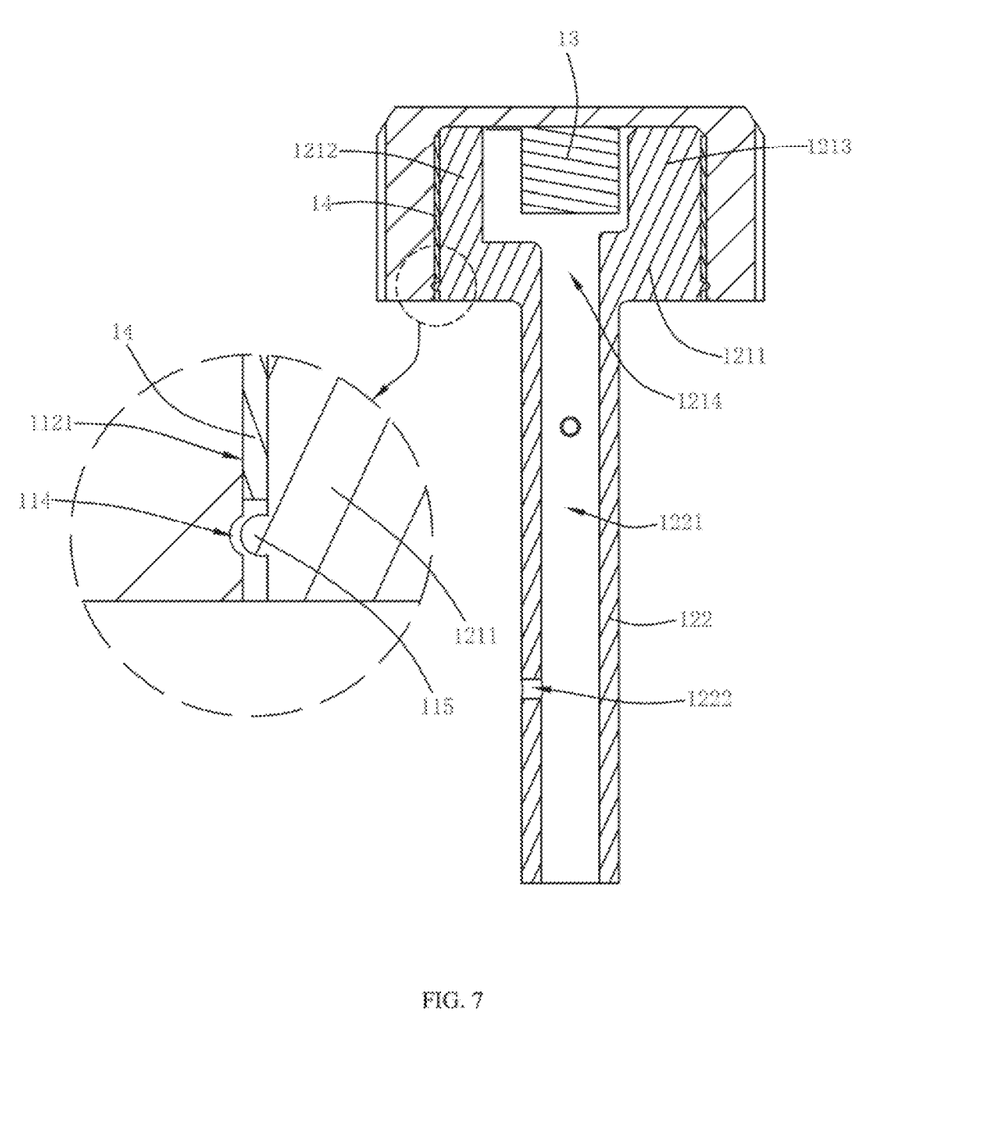
FIG. 7 is a cross-sectional view of the knob unit of FIG. 3 taken along another direction.

Referring to FIG. 5-FIG. 7, the rotary shaft 12 is mounted at the open end of the rotating cover 11. The rotary shaft 12 includes a connecting portion 121 and a shaft body 122 connected to the connecting portion 121. The connecting portion 121 and the shaft body 122 are integrally formed.

The connecting portion 121 is received in the cavity of the rotating cover 11. The connecting portion 121 includes a first portion 1211 connected to the shaft body 122, and a second portion 1212 and a third portion 1213 which extend from opposite two ends of the first portion 1211 along a direction away from the shaft body 122. The second portion 1212 and the third portion 1213 are arranged in parallel and spaced from each other. The second portion 1212 and the third portion 1213 abut on the corresponding mounting surfaces 1121. Since the mounting surfaces 1121 are flat, a contact area between the rotary shaft 12 and the rotating cover 11 is increased, and torque thus can be transmitted between the rotary shaft 12 and the rotating cover 11 effectively, thereby transmitting a rotating driving force from the rotating cover 11 to the shaft body 122 to drive the shaft body 122 to rotate. The foams 14 are respectively sandwiched between the second portion 1212 and the third portion 1213 of the rotary shaft 12 and the mounting surface 1121 of the rotating cover 11, which facilitates to reduce noise and improve user experience.

The first portion 1211 is provided with a first through hole 1214 along the Z-axis direction. In this embodiment, the Z-axis direction is the height direction of the rotary shaft 12. The shaft body 122 is fixedly connected to the first portion 1211. The shaft body 122 is provided with a second through hole 1221 along the Z-axis direction. The first through hole 1214 communicates with the second through hole 1221, cooperatively forming a wire channel.

In some embodiments, a side wall of the shaft body 122 defines a wire hole 1222 which communicates the second through hole 1221 with the outside of the shaft body 122.

A pair of protrusions 115 extends respectively from opposite two ends of the first portion 1121 along directions towards the mounting surfaces of the rotating cover 11. The protrusions 115 conform to the latching slots 114, and are engaged in the corresponding latching slots 114, thereby realizing connection of the rotating cover 11 and the rotary shaft 12 and effectively avoiding displacement of the rotary shaft 122 relative to the rotating cover 11 along the Z-axis direction.

A pair of second connecting pole 116 extends respectively from two sides of the first portion 1211 along directions towards the connecting surfaces 1122 of the rotating cover 11. The second connecting poles 116 are aligned with the corresponding first connecting poles 113, respectively. One end of the spring 16 is mounted around the first connecting pole 113, the other end of the spring 16 is mounted around the second connecting pole 116. Adjacent two ends of the first connecting pole 113 and the second connecting poles 116 are spaced from each other, and a middle portion of the spring 16 between the adjacent two ends of the first connecting pole 113 and the second connecting poles 116 is suspended.

The motor 13 is fixedly connected to the rotating cover 11, and is received in a space formed between the second portion 1212 and the third portion 1213. In some embodiments, the motor 13 is fixed to the closed end of the rotating cover 11. The motor 13 is configured to drive the rotating cover 11 to vibrate, thereby generating haptic feedback. Power wires and control wires of the motor 13 are laid in the wire channel, and do not need to be exposed, which is safe and reliable in use, and the service life of the power wires and the control wires is prolonged.

The motor 13 vibrates along the Y-axis direction, and the spring 15 extending along the Y-axis direction is capable of enhancing the vibration effect of the motor 13, improving haptic feedback. Since the rotating shaft 12 and the rotating cover 11 are fixedly connected together by engagement of the protrusions 115 in the latching slots 114, the spring 16 is thus not affected by torsion of the rotary cover 11 and is not easy to fall off the connecting poles 113, 116 during the rotation of the rotary cover 11.

Figure 8:
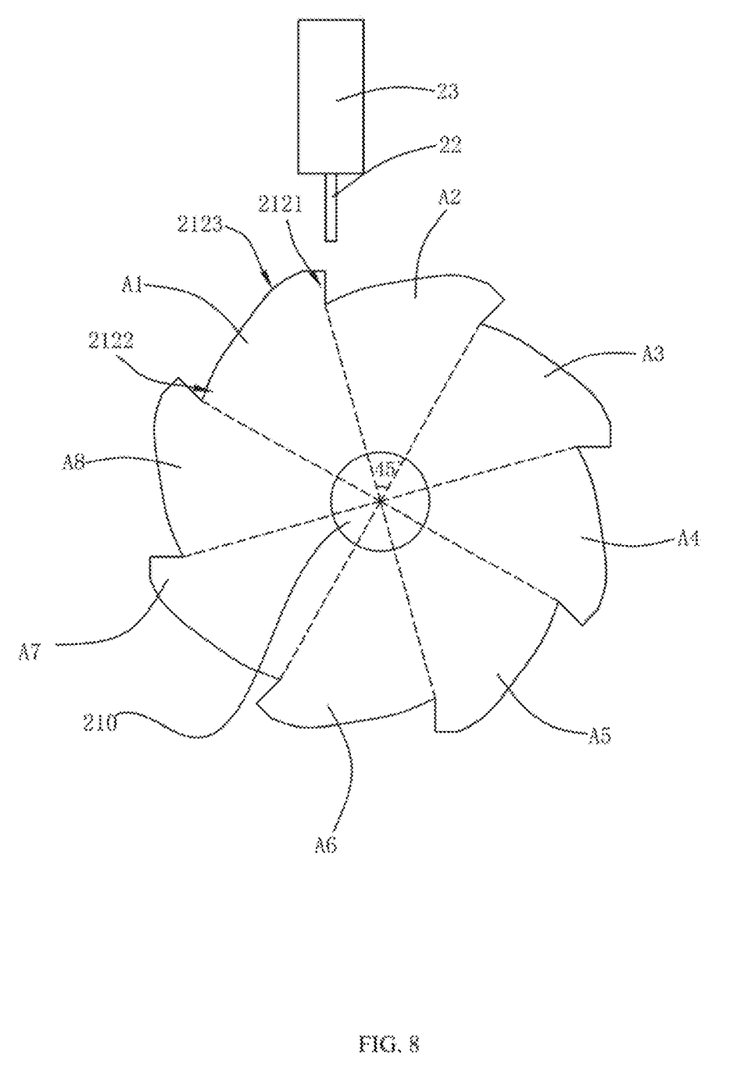
FIG. 8 is a schematic view of the knob device for vehicle provided by the present disclosure at an initial state.

Referring to FIG. 2 and FIG. 8, the locking unit 2 is configured to limit the rotation of the shaft body 122, thereby realizing locking of the knob unit 1. The locking unit 2 includes a rotary wheel 21, a locking pole 22 configured to cooperating with the rotary wheel 21, and an actuator 23 configured for driving the locking pole 22 to move. The locking pole 22 is connected to the actuator 23, and the actuator 23 is capable of driving the locking pole 22 to move towards the rotary wheel 21 or retract away from the rotary wheel 21. In some embodiments, the actuator 23 comprises a solenoid which comprises a stationary part having a coil and a moveable part having an iron core. When the coil is energized, the moveable part is driven to move forward or backward. The locking pole 22 is connected to the moveable part of the solenoid. Alternatively, the locking pole 22 is integrally formed with the moveable part of the solenoid, that is, the locking pole 22 is a portion of the moveable part of the solenoid. Understandably, the actuator 23 may comprises a linear motor to drive the locking pole to move forward or backward.

Specifically, the rotary wheel 21 includes a main portion 211 which has a mounting hole 210 and a plurality of locking teeth 212 formed at a periphery of the main portion 211. The plurality of locking teeth 212 are distributed along a ring around the central axis of the rotary wheel 21. The rotary wheel 21 is fixedly sleeved on the rotary shaft 12 via the mounting hole 210.

In this embodiment, the number of the locking teeth 212 is eight, that is, an index angle of the rotary wheel 21 during each rotation is 45°. In other embodiments, the number of the teeth 212 may be any other numbers, which is not limited in the present disclosure.

Figure 10:
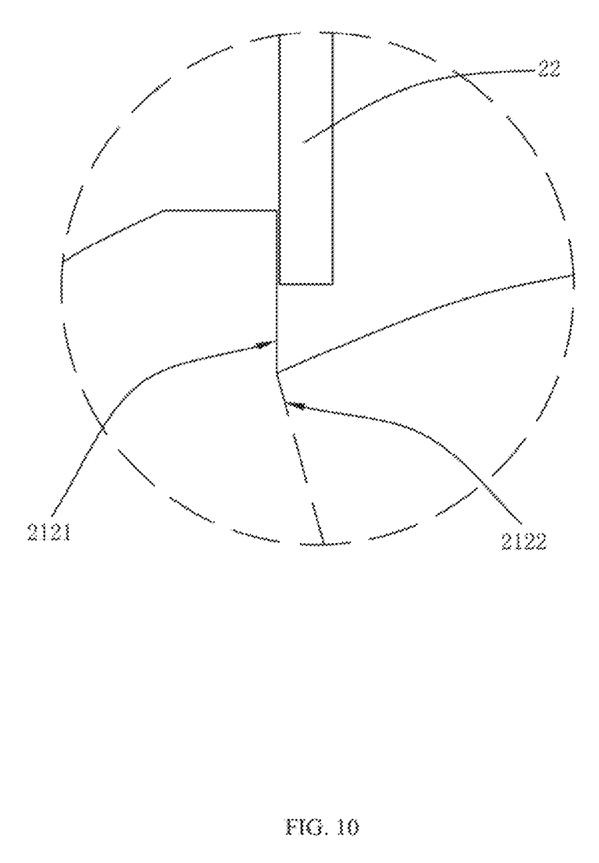
FIG. 10 is an enlarged view of the encircled part X in FIG. 9.

The locking tooth 212 includes a first end 2121, a second end 2122, and a transition surface 2123 connecting the first end 2121 and the second end 2122. A distance between the first end 2121 and the central axis of the rotary wheel 21 is greater than a distance between the second end 2122 and the central axis of the rotary wheel 21. The transition surface 2123 is curved. The first end 2121 of each locking tooth 212 is directly connected to the second end 2122 of an adjacent locking tooth 212, and the second end 2122 of each locking tooth 212 is directly connected to the first end 2121 of another adjacent locking tooth 212.

Specifically, for more clearly describing the content of the present disclosure, the locking teeth 212 are labeled as A1 to A8 in a clockwise direction.

Figure 9:
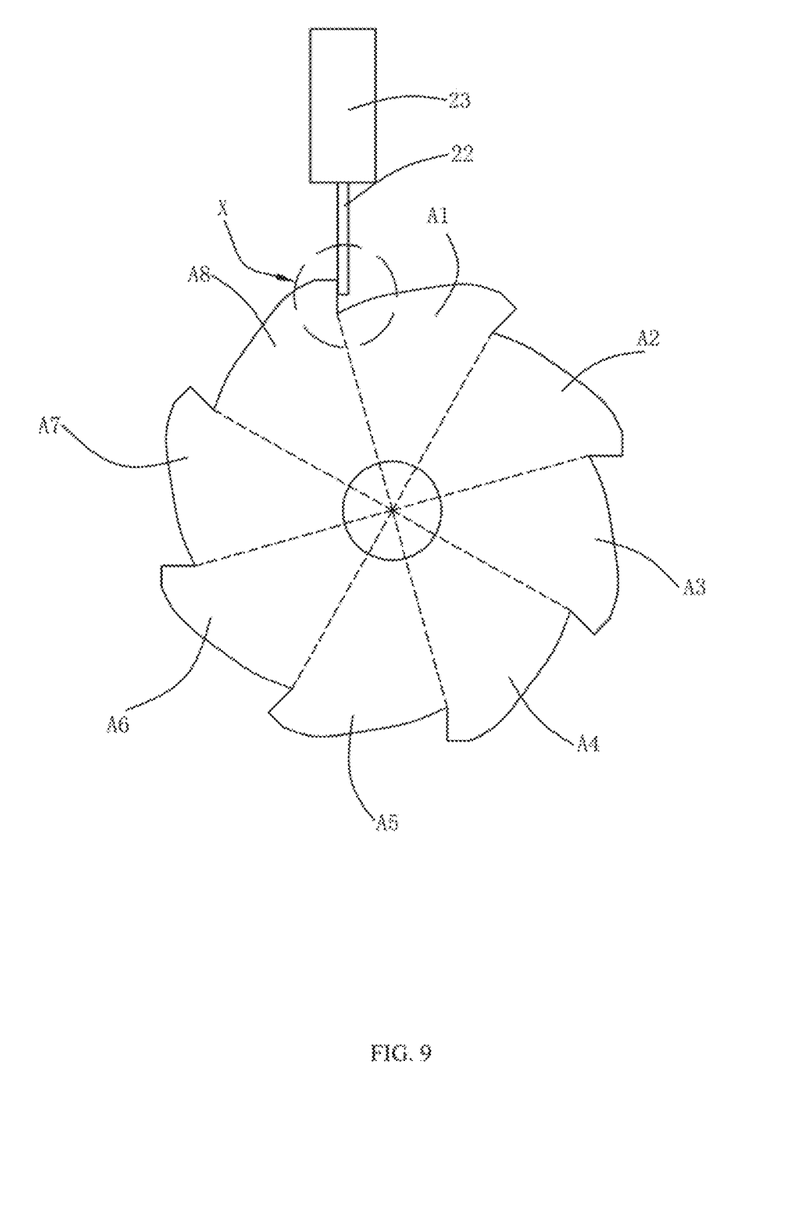
FIG. 9 is a perspective, schematic view of the knob device for vehicle of FIG. 8 at a locking state in a clockwise direction.

Referring to FIG. 8, in an initial position, the locking pole 22 is located at a retracted position and close to the first end of the locking tooth Al. Referring to FIG. 9 and FIG. 10, the rotating cover 11 is rotated clockwise to drive the rotary wheel 21 to rotate 45° clockwise. At the moment, the locking pole 22 is close to the first end 2121 of the locking tooth A8. Then, the actuator 23 drives the locking pole 22 to move outwardly to a first locking position M1 in which the locking pole 22 abuts against the first end 2121 of the locking tooth A8. Thus, movement of the first end 2121 of the locking tooth A8 is blocked by the locking pole 22, and the clockwise rotation of the rotary wheel 21 is therefore blocked. Consequently, the knob unit 1 in the clockwise direction is locked.

The rotary wheel 21 is capable of locking the knob unit 1 clockwise, thereby realizing diverse use requirements of the knob device for vehicle.

Figure 11:
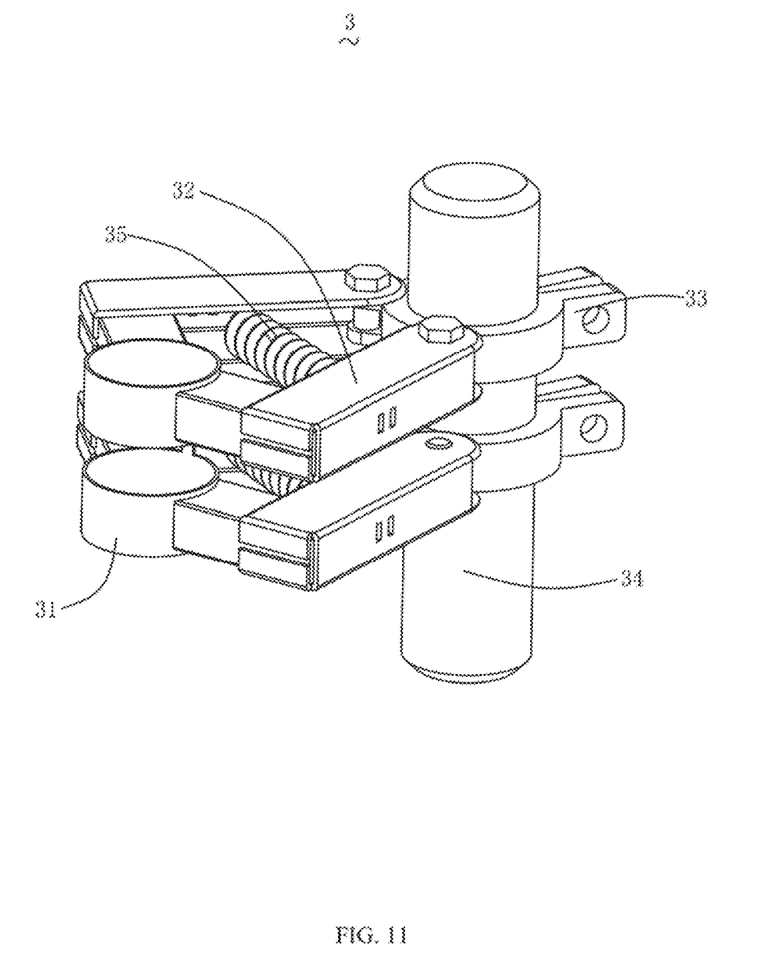
FIG. 11 is a perspective, schematic view of a carbon brush slip ring unit.

Referring to FIG. 11, the carbon brush slip ring unit 3 is connected to the knob unit 2, for providing electric power to the motor 13. Specifically, the carbon brush slip ring unit 3 includes slip rings 31 mounted around the shaft body 122, carbon brushes 32 for slidably contacting with the slip rings 31, and terminals 33 connected to the carbon brushes 32. The terminals 33 are fixed on the fixed shaft 34.

In this embodiment, the number of the slip rings 31 is two, and the two slip rings 31 are spaced from each other. The power wires of the motor 13 extend through the wire hole 1222 and are fixed to the slip rings 31 respectively. Two opposite sides of each of the slip rings 31 are provided with corresponding two of the carbon brushes 32. An elastic member 35 is arranged between the corresponding two carbon brushes 32, and the two carbon brushes 32 are simultaneously fixed to one of the terminals 33. When the shaft body 122 rotates, the shaft body 122 and the slip ring 31 rotate together. The carbon brushes 32 slidably contact with the slip rings 31, which can effectively transfer electric energy between the carbon brushes 32 and the sling rings 31. The elastic member 35 is sandwiched between two carbon brushes 32 and is in an extended state after installation. The extended elastic member 35 can generate a tighten force between the two carbon brushes 32 to urge the carbon brushes 32 to firmly contact with the slip rings 31, thereby avoiding displacement of the carbon brushes 32 away from the slip rings 31.

The terminals 33 are configured to be electrically connected to an external power source, for providing electric power to the motor 13.

The encoder 5 is connected to the shaft body 122 by the coupling 4. The encoder 5 is used to detect the rotation angle of the rotary wheel 21 and transmit the detection data in response to the rotation angle to the controller 6. The controller 6 receives the detection data and controls the operation of the actuator 23 in response to the detection data.

Compared with the related arts, the knob device for vehicle according to exemplary embodiments of the present disclosure comprises a locking unit 2 which includes a rotary wheel 21, a locking pole 22 cooperating with the rotary wheel 21, and an actuator 23 configured for driving the locking pole 22 to extend out or retract. The rotary wheel 21 includes a plurality of locking teeth 212 each comprising a first end 2121 and a second end 2122. The locking pole 22 can be driven to move outwardly to abut against the first end 2121 of a corresponding tooth 212, thereby blocking rotation of the rotary wheel clockwise, locking the rotary wheel 21 clockwise and realizing diverse use requirements of the knob device for vehicle.

The above are only embodiments of the present disclosure. It should be noted that those of ordinary skill in the art can make improvements without departing from the inventive concept of the present disclosure, but these improvements should be within the protection scope of the present disclosure.

The invention claimed is:

1. A knob device for vehicle comprising a knob unit and a locking unit,
the knob unit comprising:
a rotating cover with an open end;
a rotary shaft mounted to the open end of the rotating cover; and
a motor fixed to the rotating cover and configured to drive the rotating cover to vibrate;
the locking unit comprising:
a rotary wheel mounted to the rotary shaft, the rotary wheel comprising a main body fixed to the rotary shaft, and a plurality of locking teeth being arranged at a periphery of the main body, the plurality of locking teeth being distributed in a ring around a central axis of the rotary wheel, the locking tooth comprising a first end, a second end and a surface connecting the first end and the second end, a distance between the first end and the central axis of the rotary wheel being greater than a distance between the second end and the central axis of the rotary wheel;
a locking pole being provided corresponding to the first end and configured to abut the first end to block rotation of the rotary wheel; and
an actuator connected to the locking pole and configured to drive the locking pole to move.

2. The knob device of claim 1, wherein the number of the locking teeth is eight, and an angle spanned by each locking tooth is 45°.

3. The knob device of claim 1, wherein the transition surface is curved.

4. The knob device of claim 1, wherein the rotating cover comprises an outer surface and an inner surface opposite to the outer surface, the inner surface comprises two mounting surfaces arranged in parallel and spaced from each other and two connecting surfaces connecting the two mounting surfaces.

5. The knob device of claim 4, wherein two symmetrical first connecting poles extend from the connecting surfaces along directions away from the outer surface, two symmetrical latching slots are recessed from the mounting surfaces along directions towards the outer surface, the two first connecting poles are arranged along a Y-axis direction, and the two latching slots are arranged along an X-axis direction, wherein the Y-axis direction is parallel to a vibration direction of the motor, and the X-axis direction is perpendicular to the Y-axis direction.

6. The knob device of claim 5, wherein the rotary shaft comprises a connecting portion and a shaft body connected to the connecting portion, the connecting portion is received in the open end of the rotating cover, the connecting portion comprises a first portion connected to the shaft body, and a second portion and a third portion which extend from opposite two ends of the first portion along a direction away from the shaft body, the second portion and the third portion are arranged in parallel and spaced from each other, and the second portion and the third portion abut on the mounting surfaces respectively.

7. The knob device of claim 6, wherein a protrusion extends from each of the two ends of the first portion along a direction towards a corresponding mounting surface of the rotating cover, the protrusions conform to the latching slots respectively, and the protrusions are engaged in the latching slots respectively.

8. The knob device of claim 6, wherein a second connecting pole extends from each of opposite two sides of the first portion along a direction towards the connecting surface of the rotating cover, each second connecting pole is aligned with a corresponding first connecting pole, the knob unit further comprises a spring, one end of the spring is mounted around the first connecting pole, the other end of the spring is mounted around the second connecting pole, adjacent ends of the first connecting pole and the second connecting pole are spaced from each other, and a middle portion of the spring between the adjacent ends of the first connecting pole and the second connecting pole is suspended.

9. The knob device of claim 6, wherein a space is formed between the second portion and the third portion, and the motor is received in the space.

10. The knob device of claim 6, wherein the connecting portion and the shaft body are integrally formed.

11. The knob device of claim 1, wherein the knob device further comprises an encoder and a processor, the encoder is connected to the rotary shaft by a coupling, the encoder is configured to detect a rotation angle of the rotary wheel and transmit a detection data in response to the rotation angle to the processor, and the processor is configured to control operation of the actuator in response to the detection data.

12. The knob device of claim 1, wherein the locking pole is made of iron, and the actuator comprises a solenoid which comprises a stationary part and a moveable part moveable relative to the stationary part, the locking pole being a portion of the moveable part or connected to the moveable part.

13. The knob device of claim 1, further comprising a brush slip ring unit which comprises a pair of slip rings fixed around the rotary shaft and brushes slidably contacting with the slip rings respectively, wherein the rotary shaft defines a wire channel, and power wires and control wires of the motor are arranged in the wire channel and electrically connected to the slip rings respectively.

14. The knob device of claim 13, wherein the brush slip ring unit comprises a pair of brushes corresponding to each of the slip rings, and an elastic member connected between the pair of brushes and configured to urge the pair of brushes to firmly contact with the corresponding slip ring.

\* \* \* \* \*